Feb. 22, 1966 N. F. PHOTIADES 3,237,128

CIRCUIT FOR PRESETTING THE MAGNETIC STATE OF A MAGNETIC OSCILLATOR

Filed Nov. 14, 1962

INVENTOR.
NICHOLAS F. PHOTIADES

BY Omund R. Dahle

ATTORNEY

United States Patent Office 3,237,128
Patented Feb. 22, 1966

3,237,128

CIRCUIT FOR PRESETTING THE MAGNETIC STATE OF A MAGNETIC OSCILLATOR

Nicholas F. Photiades, Mason City, Iowa, assignor to Honeywell Inc., a corporation of Delaware Filed Nov. 14, 1962, Ser. No. 237,551
6 Claims. (Cl. 331—113)

This invention relates to solid-state magnetic oscillators and more specifically relates to improved apparatus for presetting the flux of the square loop magnetic core of the solid-state magnetic oscillator timer circuit after the timing function is completed.

In a magnetic oscillator which utilizes a volt-second integration principle for establishing the time base, the magnetic core utilized is one having a substantially rectangular hysteresis loop material. In such an oscillator, the magnetic core is driven sequentially from one state of saturation to the other, with a complete cycle of oscillation being obtained each time the magnetic core is caused to traverse its entire major hysteresis loop. In this type of timer circuit, no energy is stored in the core and for this reason upon the withdrawal of power to the magnetic oscillator, the oscillation is stopped immediately. Thus, depending upon the instant of power shutoff, the magnetic state of a core may be at any point on the hysteresis loop of the core. Upon the reapplication of power to the magnetic oscillator, the first cycle of operation begins substantially at the exact point on the hysteresis loop of the core at which power was removed on the previous operation. Under most conditions this will result in a fractional initial cycle being generated. In precision timer circuits where the required timing increments range from milliseconds to seconds, it is essential that the first oscillation starts at the exact beginning of a cycle, and a haphazard starting of the oscillator cannot be tolerated. This is especially true where the time period of one cycle or some of the time periods of a number of cycles are used to control the occurrence of events, such as in counters or the like.

An object of this invention is to provide an improved solid-state magnetic core oscillator timer circuit having means for driving the core in the magnetic oscillator to a predetermined state of saturation when the timing function is completed.

Another object of this invention is to provide in a solid-state magnetic oscillator apparatus for presetting the magnetic core to a predetermined point on its hysteresis loop upon the removal of power from the oscillator.

Still another object of this invention is to provide an improved solid-state magnetic core oscillator timer circuit having means to insure that the initial cycle of operation always commences from a predetermined point on the hysteresis loop of the magnetic core.

These and other objects of the invention will become more apparent upon a consideration of the specification, claims and drawing of which:

Figures 2, 2A:
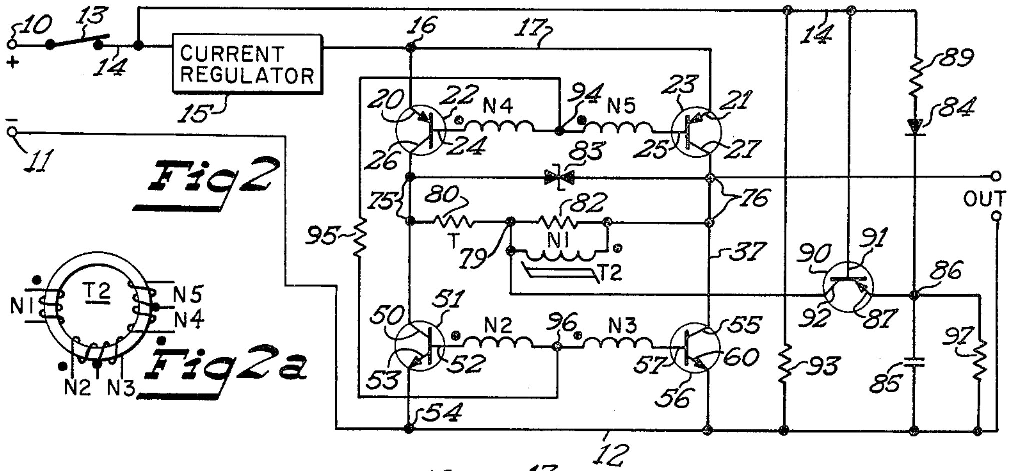
FIGURE 2 is a schematic representation of the circuit of another embodiment of the invention.
Figure 3:
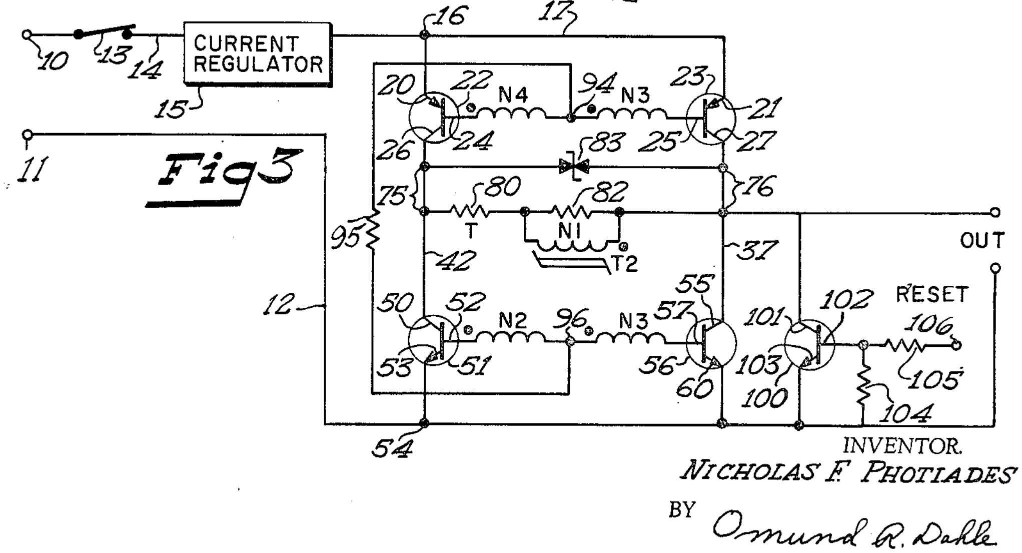

FIGURE 2*a* is a diagrammatic representation of a transformer used in the circuit of FIG. 2; and FIGURE 3 is a schematic representation of a further embodiment of the invention.

Figure 1:
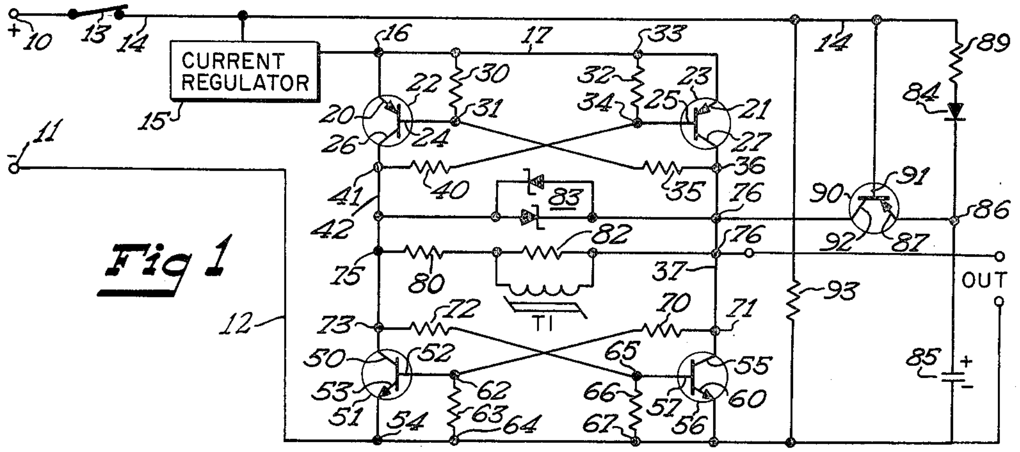
FIGURE 1 is a schematic representation of the circuit of one embodiment of this invention.

Referring now to FIGURE 1, a pair of input terminals 10 and 11 are connected across a suitable source of direct current potential, the terminal 10 being positive with respect to the terminal 11. Terminal 11 is connected to a common negative lead 12 and the positive terminal 10 is connected through a power switch

13, a conductor 14, a constant current regulating impedance means 15 to a junction 16 on a conductor 17.

The conductor 17 is directly connected to a pair of emitter electrodes 20 and 21 of a pair of semiconductor current control devices 22 and 23, which are herein disclosed as being pnp type transistors. Transistors 22 and 23 also include, respectively, base electrodes 24 and 25 and collector electrodes 26 and 27. A biasing resistor 30 is connected between the conductor 17 and a junction 31, which junction 31 is directly connected to the base electrode 24. Similarly, a resistor 32 is connected from the conductor 17 to a junction 34, which junction 34 is directly connected to the base electrode 25. The base electrode 24 of transistor 22 is also cross-coupled to the collector electrode 27 of transistor 23 through a path which includes the junction 31, a cross-coupling resistor 35, and a junction 36 on a conductor 37 which is directly connected to the collector 27. The base electrode 25 of transistor 23 is similarly cross-coupled to the collector electrode 26 of transistor 22 through a path which may be traced from base 25 and junction 34 through a cross-coupling resistor 40 and a junction 41 on a conductor 42 which is directly connected to collector electrode 26. The transistors 22 and 23, taken together with the associated components above described, form a first bistable switching circuit.

A second bistable circuit which is very similar to the first bistable circuit includes a further pair of semiconductor current control devices 51 and 56, and this circuit will be described below. The conductor 42 is directly connected to a collector electrode 50 of an npn junction transistor 51. The transistor 51 also includes a base electrode 52 and an emitter electrode 53, the emitter electrode being directly connected to a junction 54 on the negative conductor 12. The conductor 37 is directly connected to the collector electrode 55 of an npn transistor 56, which transistor also includes a base electrode 57 and an emitter electrode 60, which emitter electrode is directly connected to the negative conductor 12. The base electrode 52 is connected by a junction 62 and a biasing resistor 63 to a junction 64 on the conductor 12. Similarly, the base electrode 57 is connected by a junction 65 and a biasing resistor 66 to a junction 67 on the negative conductor 12. The base electrode 52 is further cross-coupled to the collector electrode 55 by a circuit which may be traced from the base 52 through the junction 62 and a cross-coupling resistor 70 to a junction 71 on the conductor 37 and thereby to the collector electrode 55. Base electrode 57 is likewise connected through the junction 65 and a cross-coupling resistor 72 to a junction 73 on the conductor 42, and thus to the collector electrode 50.

The above described circuit comprises a pair of bistable circuits arranged to form a bridge type network. A pair of terminals 75 and 76, respectively, on the conductors 42 and 37 form the mid-points of the bridge type network. Connected across the mid-points of the bridge from the junction 75 is a temperature compensating frequency controlling resistor 80 in series with a square loop saturable core timing toroid T1, the other terminal of which is connected to the junction 76. The saturable timing toroid has a substantially rectangular hysteresis loop core material. Connected in parallel with the timing toroid winding T1 is a further frequency stabilizing resistor 82. A voltage reference diode 83 is connected across the midpoints of the bridge network in parallel with the network comprising elements 80, 82 and T1. This voltage reference may take the form of a double anode zener diode or a pair of matched zener diodes connected in opposite polarity relationship to each other, as shown.

A further circuit may be traced from the conductor 14 through a current limiting resistor 89, a rectifying junction diode 84 and a storage capacitor 85 to the negative conductor 12. A junction 86 between the diode 84 and the capacitor 85 is connected to the emitter electrode 87 of a pnp type transistor 90. Transistor 90 also includes a base electrode 91 and a collector electrode 92. The base electrode 91 is directly connected to the conductor 14 and the collector electrode 92 is connected to the junction 76. A resistor 93 interconnects the conductor 14 with the conductor 12. The circuit comprising elements 89, 84, 85, 90 and 93 operates to charge the capacitor 85 during normal operation of the timer and to utilize the energy stored on the capacitor to place the toroid T1 to the predetermined state of saturation after the supply potential has been disconnected from the oscillator circuit.

In considering the operation of the circuit of FIGURE 1, the first and second bistable circuits are arranged such that transistors 22 and 56 are on or conductive when transistors 23 and 51 are off or nonconductive, and vice versa. The voltage divider network across the bridge comprising resistors 80 and 82 and the timing toroid T1 together with the voltage stabilizing zener reference 83 make up the load for the bistable bridge network. The bistable bridge network is energized by a constant current source regulated by constant current regulator 15.

The time base of the oscillator timer circuit depends on the volt-second integration of the potential applied to the magnetic core of timing toroid T1. The precision oscillator requires that a closely regulated voltage appear across conductors 42 and 37 since the time required for saturation of the core is inversely proportional to the voltage being applied to the winding, other factors being constant. This voltage across the toroid winding is maintained constant by the voltage reference diode 83. When the core of the saturable toroid is not saturated, the saturable element acts as a high impedance, and the biasing and cross-coupling resistors for each of the transistors are chosen to be of a value which permits the transistors for the bridge to be biased to a point in which the transistors are fully on or saturated for load current required prior to saturation of the core of the timing toroid T1.

A first half cycle of operation of the oscillator may now be considered in which transistors 22 and 56 are conductive. A current path may be traced from the positive terminal 10 through the power switch 13, conductor 14, constant current regulator 15, transistor 22, conductor 42, resistor 80, toroid winding T1 and resistor 82, conductor 37, transistor 56, and conductor 12 to the terminal 11. The first half cycle continues until saturation occurs in the core of timing toroid T1. The decrease of impedance of the saturating device tends to decrease the voltage from junction 16 to conductor 12 thus reducing the base drive of the conducting transistors. The transistor bias current paths are designed so the conducting transistors come out of saturation whereupon a sufficient voltage drop appears across the on-transistors 52 and 56 to cause the bistable circuits to switch to their opposite mode or state of conduction. The second half cycle of operation is thereby commenced in which transistors 23 and 51 are conductive. The voltage is reversed across the winding of the timing toroid T1 so that it again becomes a high impedance, the second half cycle continuing until saturation is reached in the reversed direction in the saturable device T1. At this point the two bistable circuits again switch to their original mode of operation to complete a cycle and commence a new cycle of operation.

When power is initially applied to the circuit, current flows through the current limiting resistor 89 and the rectifying diode 84 to charge the storage capacitor 85 to a voltage which approaches the supply potential. Sufficient energy is stored in the capacitor 85 to drive the toroid T1 from one state of saturation to the other such that the toroid is ultimately left in a predetermined state of saturation when power is removed. The rectifying diode 84 is effective to maintain the transistor 90 in the off state by back-biasing the emitter-base junction when power is applied to the oscillator.

When the power switch 13 is opened, the transistor 90 is no longer maintained to cut off and a current flows from the capacitor 85 through junction 86, from emitter 87 to base 91 of the transistor 90 and through the biasing resistor 93. A small portion of the energy in the capacitor 85 is thus used to turn the transistor 90 to an on or conductive state. With the transistor 90 turned on a current also flows in the emitter-collector path of the transistor to apply the voltage from the capacitor 85 to junction 76 of the magnetic oscillator. This positive voltage at junction 76 renders the transistor 51 conductive due to the current flowing through resistors 70 and 63. With transistor 51 conductive, the transistor 56 is maintained nonconductive so that the capacitor 85 discharges through transistor 90, resistors 82 and 80 and the toroid T1, thus driving the toroid T1 to a predetermined state of saturation.

When power is subsequently reapplied to the oscillator by closing the switch 13, the transistor 22 and 56 of the magnetic oscillator are driven in the on state due to the magnetic steering of the toroid T1. The current flowing through the toroid winding is thus in the opposite direction to that flowing during the reset operation. The first cycle of operation will always be a complete full cycle since oscillation is started from a specific state of core saturation.

Turning now to FIGURE 2, there is disclosed a reset circuit similar to the reset circuit of FIGURE 1 and adapted to reset the core of a modified magnetic oscillator circuit from that disclosed in FIGURE 1. Many of the circuit components of FIGURE 2 are identical in form and purpose to those disclosed in FIGURE 1 and these are given the same identifying reference numerals in FIGURE 2.

In FIGURE 2 the major difference in the magnetic oscillator circuit from that disclosed in FIGURE 1 is in the biasing arrangement for the four transistors. The saturable magnetic toroidal transformer T2 has a primary winding N1 and four secondary windings N2, N3, N4 and N5. The relationship of the windings on this toroidal transformer is shown diagrammatically in FIGURE 2*a*. The secondary windings N4 and N5 each have one terminal connected to a common junction 94, the opposite extremities of these windings being connected to the base electrodes 24 and 25, respectively. The common junction 94 is connected through a current limiting resistor 95 to a common junction 96 to which one extremity of windings N2 and N3 are connected. The opposite extremities of these windings N2 and N3 are connected to the base electrodes 52 and 57, respectively.

Another change in the reset circuit of FIGURE 2 as compared with FIGURE 1 is that the collector electrode 92 of transistor 90 is connected to the opposite terminal of winding N1 of the transformer T2. In other words, the collector electrode 92 is connected to winding N1 at the junction between resistors 80 and 82. An advantage of this location for the reset connection is that less energy is required to perform the reset. This is partially due to the fact that less energy is being dissipated through diode 83. A charge limiting resistor 97 is connected between junction 86 and the negative conductor 12. The function of resistor 97 is to limit the voltage across capacitor 85 to some fraction of the supply voltage between terminals 10 and 11. The fraction or proportion of the supply voltage appearing across capacitor 85 depends on the relative values of resistors 89 and 97.

In considering the operation of the circuit of FIGURE 2, the pnp transistors 22 and 23 form the first bistable circuit and the npn transistors 51 and 56 form the second bistable circuit. The polarities of the secondary biasing windings N2, N3, N4 and N5 are such that pnp transistor 22 and npn transistor 56 are biased on or conductive when transistors 23 and 51 are biased off and vice versa. As in FIGURE 1, the resistors 80 and 82, the winding N1 and the voltage reference diode 83 comprise the load for the bistable bridge configuration.

Assuming transistors 23 and 51 are conductive, the junction 76 is positive with respect to the junction 75, and the resulting voltage across the primary winding N1 of the timing toroid T2 is in a direction to cause induced voltages on secondary biasing windings N5 and N2 to maintain these transistors conductive. The voltages induced on secondary biasing windings N3 and N4 are of a polarity to bias the transistors 22 and 56 to cutoff. The current path for the control circuit in this half cycle of operation may be traced from the conductor 17 to transistor 23, through the emitter-base junction thereof and winding N5 to junction 94, through the current limiting resistor 95 to junction 96, and through the winding N2 and the base-emitter junction of transistor 51 to the negative conductor 12. The resistor 95 limits the current in the base circuit of both the pnp and npn transistor. The current path for the load circuit may be traced through transistor 23 from emitter to collector, to junction 76, through the load comprising winding N1, temperature compensating resistor 80, resistor 82 and voltage reference diode 83, to junction 75, and through transistor 51 from collector to emitter to negative conductor 12. When the toroidal core T2 saturates, the first half cycle of oscillation is completed, the conducting transistors turn off and the inductive flyback action in the toroid T2 during the switching period induces an opposite polarity on the secondary windings causing transistors 22 and 56 to turn on initiating the second half cycle. Junction 75 now becomes positive with respect to junction 76 reversing the polarity across the winding N2 and bias voltages are induced on windings N5 and N2 to maintain nonconductive the transistors 23 and 51. When toroidal core T2 saturates in the opposite direction, the bias voltages again reverse and the cycle repeats.

In the same manner as described for FIGURE 1, the zener voltage reference diode 83 maintains constant the voltage between junctions 75 and 76 in order that a very closely regulated voltage is maintained on winding N1 thereby stabilizing the frequency of the oscillator.

When the power switch 13 is opened, the transistor 90 is no longer maintained cutoff and a current flows from the capacitor 85 through junction 86, from emitter 87 to base 91 of the transistor 90 and through the biasing resistor 93 thereby utilizing a small portion of the energy in the capacitor 85 to turn on the transistor 90. A current also flows in the emitter-collector path of the transistor 90 from the capacitor 85 to the junction 79 and through the winding N1 from junction 79 to junction 76 to preset the toroid T2 to the predetermined state of saturation. The reset current may further be traced through the winding N1 from junction 79 to junction 76 and through the transistor 56 from collector 55 to emitter 60 and thence back to the capacitor 85. Transistor 56 is turned on due to base current in transistor 56 which flows from junction 79 through the resistor 80, through the collector-base junction of transistor 22, through winding N4 to junction 94, through resistor 95 to junction 96, and through winding N3 and the base-emitter junction of transistor 56 thus turning the transistor on. The transistor 51 is maintained in the off state due to the voltage induced in windings N2 and N3 when current flow results in the winding N1, thus back-biasing the emitter-base junction of transistor 51 maintaining it in the off state. This reset current from capacitor 85 through winding N1 from junction 79 to 76 places the toroid T2 in a condition of saturation in one direction. When power is reapplied by closing the switch 13, the first oscillator period is a full cycle.

Referring now to FIGURE 3, the oscillator circuit disclosed is substantially identical with that disclosed and described in FIGURE 2. An npn transistor 100 which has a collector electrode 101, a base electrode 102 and an emitter electrode 103 is connected so that its collector and emitter electrodes are in parallel with the collector and emitter electrode respectively of the transistor 56. The base electrode 102 is connected by means of a biasing resistor 104 to the negative conductor 12. The base electrode 102 is further connected by means of a resistor 105 to an external voltage signal source, not shown, which is connected to terminal 106. When a positive potential is applied to the terminal 106 with respect to the negative conductor 12, the transistor 100 is turned on due to the base current flowing through resistor 105 and the emitter-to-base junction of transistor 100. With the transistor 100 conductive, the junction 76 is clamped to negative conductor 12 by the highly conductive transistor 100. This in turn clamps the transistor 22 in the on condition forcing current through the toroid T2 from junction 75 to junction 76 and driving it into one direction of saturation. The toroid is retained in this direction of saturation as long as the transistor 100 is maintained in the conductive state. The oscillator resumes functioning the instant the voltage is removed from the input terminal 106. The first cycle of the oscillator is a complete cycle. In the embodiment shown in FIGURE 3, the maximum reset time of the oscillator is one half of the normal free running oscillator period.

In general, while I have shown certain specific embodiments of my invention, it is to be understood that this is for the purposes of illustration and that my invention is to be limited solely by the scope of the appended claims.

I claim:

1. Apparatus for presetting the magnetic state of the saturable core in the saturable core timing means of a semiconductor magnetic oscillator to a predetermined saturation point after the removal of the energizing potential therefrom, said apparatus comprising:

capacitor energy storage means connected essentially in parallel with the oscillator to be charged while the oscillator is supplied with the energizing potential;

semiconductor switching means with a control electrode and a pair of other electrodes, said semiconductor switching means having a non-conductive state and a conductive state;

biasing means connected to the control electrode of said semiconductor switching means and responsive to the condition of energization of said oscillator to maintain said switching means in its non-conductive state while the oscillator is supplied with the energizing potential and to operate said switching means into its conductive state upon removal of the energizing potential; and means including said pair of other electrodes of said semiconductor switching means conductively connecting said capacitor storage means in series with said saturable core timing means, whereby said capacitor energy storage provides sufficient energy to said saturable core timing means after the removal of energizing potential to drive said saturable core to said predetermined saturation point.

2. A magnetic oscillator with apparatus for presetting the state of a saturable magnetic core in the saturable core magnetic timing means, said oscillator comprising:

a pair of input terminals for connection to a pair of opposite polarity terminals of a source of energizing potential;

saturable core magnetic timing means including a saturable magnetic core and a winding on said core, said winding having a first and a second end;

first, second, third and fourth semiconductor switching means each having a first, a second and a third electrode;

means connecting the first electrodes of said first and third switching means to one of said input terminals, and means connecting said first terminals of said second and fourth switching means to the other of said input terminals;

means connecting the second electrodes of said first and second switching means and the third electrodes of said third and fourth switching means to said first end of said winding of said magnetic timing means and means connecting the second electrodes of said third and fourth switching means and the third electrodes of said first and second switching means to said second end of said winding;

capacitor energy means connected essentially in parallel with said oscillator means to be charged while the oscillator is supplied with the energizing potential;

a fifth semiconductor switching means with a control electrode and a pair of other electrodes, said semiconductor switching means having a non-conductive state and a conductive state;

biasing means connected to the control electrode of said fifth semiconductor switching means to maintain said switching means in its non-conductive state while the oscillator is supplied with the energizing potential and to operate said switching means into its conductive state upon removal of the energizing potential; and means including the pair of other electrodes of said fifth semiconductor switching means conductively connecting said capacitor storage means to said saturable core timing means, whereby said capacitor energy storage means provides sufficient energy to said saturable core timing means after the removal of energizing potential to drive said saturable core to said predetermined saturation point.

3. A magnetic oscillator with apparatus for presetting the state of a saturable magnetic core in the saturable core magnetic timing means, said oscillator comprising:

a pair of input terminals for connection to a pair of output terminals of a source of energizing potential;

saturable core timing means including a main winding thereon having first and second ends and further including secondary winding means;

first, second, third and fourth semiconductor switching means each having a first, a second and a third electrode;

means connecting the first electrodes of said first and third switching means to one of said input terminals, and means connecting said first terminals of said second and fourth switching means to the other of said input terminals;

means connecting the second electrode of said first and second switching means to said first end of said winding of said magnetic timing means and means connecting the second electrodes of said third and fourth switching means to said second end of said winding;

feedback means including said secondary winding means connected to the third electrodes of said first, second, third and fourth switching means to alternately switch said switching means to direct a current in one direction through said magnetic timing means and to reverse the direction of said current upon saturation of said saturable core;

capicitor energy storage means connected essentially in parallel with said oscillator means to be charged while the oscillator is supplied with the energizing potential;

a fifth semiconductor switching means with a control electrode and a pair of other electrodes, said semiconductor switching means having a non-conductive state and a conductive state;

biasing means connected to the control electrode of said fifth semiconductor switching means to maintain said switching means in its non-conductive state while the oscillator is supplied with the energizing potential and to operate said switching means into its conductive state upon removal of the energizing potential; and means including the pair of other electrodes of said fifth semiconductor switching means conductively connecting said capacitor storage mans to said saturable core timing means, whereby said capacitor energy storage mans provides sufficient energy to said saturable core timing means after the removal of energizing potential to drive said saturable core to said predetermined saturation point.

4. Apparatus for presetting the magnetic state of the saturable core in the saturable core timing means of a semiconductor magnetic oscillator to a predetermined saturation point, said apparatus comprising:

a source of electric potential having a pair of opposite polarity terminals for connection to the oscillator;

a separate semiconductor switching means with a control electrode and a pair of other electrodes, said switching means having a conductive state and a non-conductive state;

means connecting one of said other electrodes of said switching means to said saturable core timing means and connecting the other of said other electrodes to one terminal of said source of electric potential; and means connecting the control electrode of said separate semiconductor switching means to a reset terminal, whereby a signal applied to said reset terminal will place said switching means into its conductive state, whereupon said saturable core will be preset to a predetermined saturation point.

5. A magnetic oscillator with apparatus for presetting the state of a saturable magnetic core in the saturable core magnetic timing means, said oscillator comprising:

a pair of input terminals for connection to a pair of output terminals of an electric potential source;

saturable core timing means including a main winding thereon having first and second ends and further including secondary winding means;

first, second, third and fourth semiconductor switching means each having a first, a second and a third electrode;

means connecting the first electrodes of said first and third switching means to one of said input terminals, and means connecting said first terminals of said second and fourth switching means to the other of said input terminals;

means connecting the second electrodes of said first and second switching means to said first end of said winding of said magnetic timing means and means connecting the second electrodes of said third and fourth switching means to said second end of said winding;

feedback means including said secondary winding means connected to the third electrodes of said first, second, third and fourth switching means to alternately switch said switching means to direct a current in one direction through said magnetic timing means and to reverse the direction of said current upon saturation of said saturable core; and a fifth semiconductor switching means having a first electrode connected to said main winding of said magnetic timing means, having a second electrode connected to one of said input terminals and having a third electrode connected to a reset terminal, whereby a signal applied to said reset terminal will place said fifth switching means into a low impedance conductive state, whereupon said saturable core will be preset to a predetermined saturation point.

6. A magnetic oscillator with apparatus for presetting the state of a saturable magnetic core in the saturable core magnetic timing means, said oscillator comprising:

a pair of input terminals for connection to a pair of output terminals of an electric potential source;

saturable core magnetic timing means including a saturable magnetic core and a winding on said core, said winding havng a first and a second end;

first, second, third and fourth semiconductor switching means each having a first, a second and a third electrode;

means connecting the first electrodes of said first and third switching means to one of said input terminals, and means connecting said first terminals of said second and fourth switching means to the other of said input terminals;

means connecting the second electrodes of said first and second switching means to said first end of said winding of said magnetic timing means and means connecting the second electrodes of said third and fourth switching means to said second end of said winding;

feedback means connected to the third electrodes of said first, second, third and fourth switching means and to said magnetic timing means to alternately switch said switching means to direct a current in one direction through said magnetic timing means and to reverse the direction of said current upon the saturation of said saturable core; and a fifth semiconductor switching means having a first electrode connected to said winding of said magnetic timing means, having a second terminal connected to one of said input terminals and having a third electrode connected to a reset terminal, whereby a signal applied to said reset terminal will place said fifth switching means into a low impedance conductive state, whereupon said saturable core will be preset to a predetermined saturation point.

References Cited by the Examiner

UNITED STATES PATENTS

| | | | |
|---|---|---|---|
| 3,080,534 | 3/1963 | Paynter | 331—110 X |
| 3,085,211 | 4/1963 | Jensen et al. | 331—113 |
| 3,098,200 | 7/1963 | Jensen | 331—113 |

ROY LAKE, *Primary Examiner.*

JOHN KOMINSKI, *Examiner.*